(12) United States Patent
Dirschbacher

(10) Patent No.: US 8,162,301 B2
(45) Date of Patent: Apr. 24, 2012

(54) CONSTRUCTION KIT FOR A MANIPULATING SYSTEM

(75) Inventor: Josef Dirschbacher, Knetzgau (DE)

(73) Assignee: Robert Bosch GmbH, Stuttgart (DE)

( * ) Notice: Subject to any disclaimer, the term of this patent is extended or adjusted under 35 U.S.C. 154(b) by 931 days.

(21) Appl. No.: 12/109,152

(22) Filed: Apr. 24, 2008

(65) Prior Publication Data

US 2008/0264811 A1 Oct. 30, 2008

(30) Foreign Application Priority Data

Apr. 27, 2007 (DE) .................... 20 2007 006 226 U

(51) Int. Cl.
*B25B 1/20* (2006.01)
(52) U.S. Cl. .............................. 269/45; 269/60; 269/71
(58) Field of Classification Search .................. 269/45, 269/43, 60, 58.71, 291, 136, 138
See application file for complete search history.

(56) References Cited

U.S. PATENT DOCUMENTS

| | | | | |
|---|---|---|---|---|
| 4,766,465 A | * | 8/1988 | Takahashi | 355/53 |
| 4,896,869 A | * | 1/1990 | Takekoshi | 269/60 |
| 5,401,010 A | * | 3/1995 | Haswell et al. | 269/45 |
| 6,367,788 B1 | * | 4/2002 | Babchuk | 269/45 |
| 6,802,499 B2 | * | 10/2004 | Grosso | 269/71 |
| 2002/0180133 A1 | * | 12/2002 | Oshima | 269/73 |
| 2008/0264811 A1 | * | 10/2008 | Dirschbacher | 206/223 |

FOREIGN PATENT DOCUMENTS

| | | |
|---|---|---|
| DE | 40 11 328 | 10/1991 |
| EP | 1 249 406 | 10/2002 |
| GB | 2 063 514 | 6/1981 |

OTHER PUBLICATIONS

Bosch Rexroth AG Catalog No. R310DE2605, Published in 2006, Apr. 2006.

* cited by examiner

*Primary Examiner* — Lee D Wilson

(74) *Attorney, Agent, or Firm* — Michael J. Striker

(57) ABSTRACT

A construction kit for a manipulating system, includes at least one first and one second element that are located parallel or at an angle to one another and are connectable to one another, at least one centering element that is located between the first and second elements, and at least one securing element for connecting the first element to the second element. The construction kit has a centering element, which has an outer circumferential surface that is provided with at least one form-locking means.

10 Claims, 2 Drawing Sheets

CONSTRUCTION KIT FOR A MANIPULATING SYSTEM

CROSS-REFERENCE TO A RELATED APPLICATION

The invention described and claimed hereinbelow is also described in German Patent Application DE 20 2007 006 226.5 filed on Apr. 27, 2007. This German Patent Application, subject matter of which is incorporated herein by reference, provides the basis for a claim of priority of invention under 35 U.S.C. 119(a)-(d).

BACKGROUND OF THE INVENTION

The invention relates to a construction kit for a manipulating system, including at least one first and one second element, which are located parallel or at an angle to one another and are connectable to one another, at least one centering element, which is located between the first and second elements, and at least one securing element for connecting the first element to the second element.

One such construction kit is known from Bosch Rexroth AG catalog No. R310 DE 2605 published in 2006. With this kit, various combinations of shafts and strut profiles can be implemented at little effort or expense for individual manipulating systems for gripping, lifting, rotating, positioning, and setting down. With this kind of flexibly combinable linear and pneumatic components, the most often-encountered manipulating tasks can be handled. As a result, even so-called linear or two-dimensional portals can be implemented quickly, safely and thus economically.

To ensure high fit precision in assembly, during operation, or upon replacement of a shaft, all the components of the entire program are equipped with precise centering, which as a rule is accomplished via centering rings. This connection technique with ease of assembly using special centering rings provides for form-locking connections with very high replicability and furthermore makes precise-fit assembly possible without requiring complicated adapter plates and complex orientation.

The centering rings of cylindrical or graduated cylindrical shape shown on page 56 of the aforementioned catalog are press-fitted into recesses in the elements to be connected, before the shafts or strut profiles are joined together using different connecting elements. As a result, precise positional fixation of the joined elements is attained.

As can be seen from the information in the catalog, the centering rings have only a slight thickness D of a few millimeters. Since each centering ring is received to the extent of half its thickness in the respective recess in the element to be connected, it proves difficult later to remove the centering ring, for instance for replacing a shaft or strut profile, since the rest of the centering ring that is still located in the recess is too small to be securely picked up by a disassembly tool. For this reason, disassembly generally causes damage to individual components.

SUMMARY OF THE INVENTION

By comparison, the object of the invention is to furnish a construction kit which has at least one centering element that can be disassembled again without major effort, and in the process, both the recess and the centering element remain undamaged.

According to the invention, this object is attained in that the construction kit has at least one centering element with an outer circumferential surface that is provided with at least one form-locking means. As a result, with a simple disassembly tool, the centering element can be removed from the recess again.

In a particularly advantageous version of the invention, the centering element is embodied as a centering ring, on the cylindrical outer circumferential surface of which there is a bore. If the drilling is done orthogonally to the center axis of the centering ring and extends all the way through the ring, forming two aligned bores diametrically opposite one another and penetrating the annular wall, then uniform extraction of the centering ring from the recess can be accomplished by putting a disassembly tool in position, such as a wedge that can be introduced into each bore.

Instead of the bore that penetrates the annular wall, however, it is also possible for only a blind bore, or a groove extending all the way around the outer circumferential surface, to be made so as to achieve the required engagement from behind for a disassembly tool.

The first or second element may be a strut profile, a housing of a module or gripper, or some other attachment element. Advantageously, at least one outer surface has an undercut groove that can be engaged by securing elements.

On the outer surfaces of the elements to be connected, which come into contact with one another, there is at least one recess each, each for receiving one centering element. Advantageously, the recesses are embodied as close-tolerance bores, which then receive the centering rings.

Since the depth of a recess is dimensioned such that it is equal to or slightly larger than half the thickness of the centering element, each centering element is received approximately halfway in each element.

The invention further relates to a manipulating system having at least two elements, which are located parallel or at an angle to one another and are joined together with a construction kit of the kind described above.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
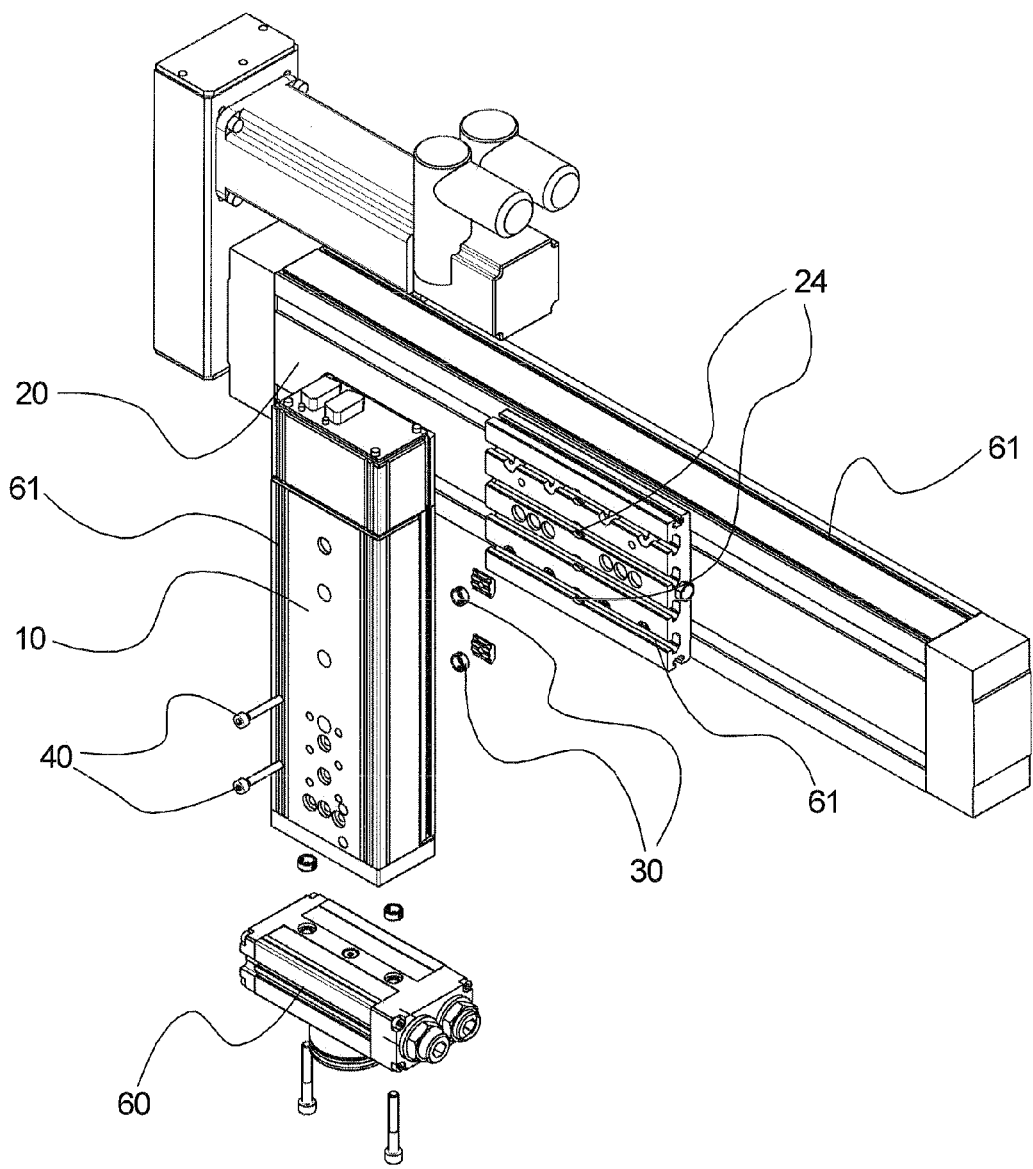
FIG. 1 is a perspective view of a manipulating system joined together using the construction kit of the invention.

The arrangement shown in FIG. 1 in an exploded view is a combination of various electric and pneumatic shafts or shaft modules and strut profiles that are put together to make a manipulating system.

As can be seen from FIG. 1, a first element 10, for instance an electrically driven linear module, is connected to a second element 20, for instance a further electrically operated linear module, via connecting means, such as connecting plates, angle irons, clamping elements, screws 40, and sliding blocks. The other shafts and strut profiles are joined together in the same way. For instance, in the exemplary embodiment shown, the first element 10 turn carries a rotary module 60.

The first or second element may be a strut profile or a housing of a module. Advantageously, at least one outer surface of the housing has an undercut groove 61 that can be engaged by securing elements.

Two centering elements 30 are located between the first and second elements and between the connecting means and one of the two elements 10, 20, respectively.

Figure 2:
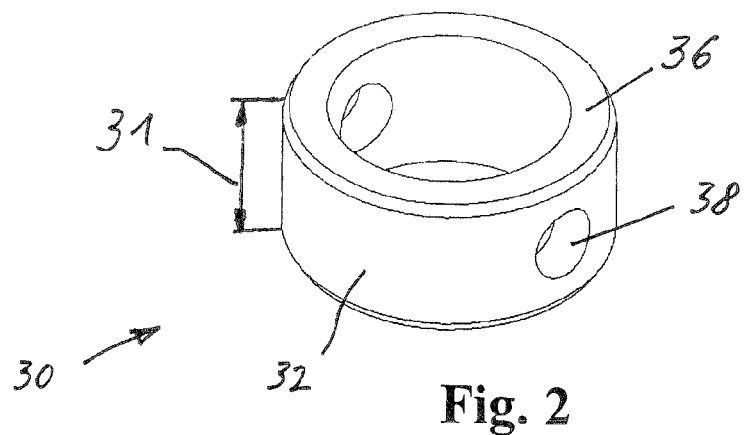
FIG. 2 is a perspective view of a centering element of the invention.

A centering element 30 embodied as a centering ring is shown in FIG. 2, on the order of a cylindrical bush. This centering ring has a closed annular wall 36 with an outer circumferential surface 32. The annular wall 36 is penetrated by two bores 38, diametrically opposite and aligned with one another, which are located orthogonally to the center axis 34. The thickness of the centering ring is indicated at 31.

Figure 3:
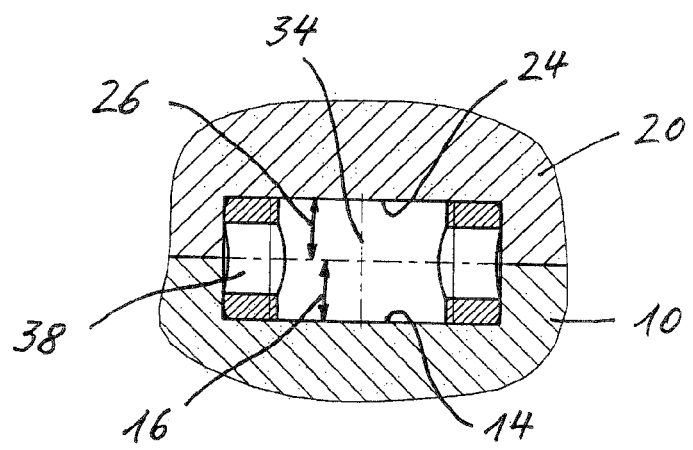
FIG. 3 is a sectional view of a centering element of the invention in the installed state.

The sectional view shown in FIG. 3 illustrates the location of the centering element 30 in the installed state. For installation, the elements 10, 20 to be connected have recesses 14, 24 that have a depth 16, 26 which is equal to or slightly larger than half the thickness 31 of the centering element. To ensure exact centering, the centering element 30 is received with a press fit in each recess 14, 24.

It can also easily be seen in FIG. 3 that the opposed bores 38 are located essentially on the plane of contact of the elements 10, 20, so that half of the centering element 30 is received in each recess 14, 24.

Figure 4:
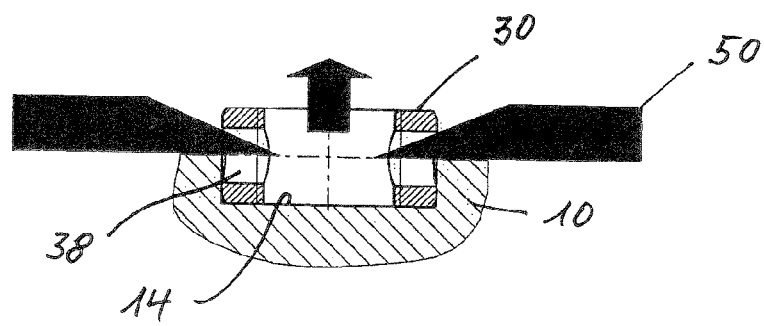
FIG. 4, roughly schematically, shows the disassembly of a centering element of the invention from a recess.

FIG. 4 shows how the centering element 30 can be removed from the recess 14 in a simple manner. In the exemplary embodiment shown, by introducing a wedge-shaped disassembly tool 50 into both bores 38, uniform extraction of the centering element 30 from the recess 14 can be accomplished, in the direction of the vertically upward-extending arrow. Thus good replicability of the form-locking connection is assured, since no damage occurs to any components whatever.

However, the invention is not limited to the exemplary embodiment described above. On the contrary, modifications from it are conceivable that make use of the scope of the claims that follow.

It will be understood that each of the elements described above, or two or more together, may also find a useful application in other types of constructions differing from the type described above.

While the invention has been illustrated and described as embodied in a construction kit for a manipulating system, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A construction kit for a manipulating system, comprising:
   at least one first element with a first surface and at least one second element with a second surface, wherein the at least one first element and the at least one second element are connectable to each other so that the first surface and the second surface contact each other;
   at least one centering ring with an annular wall defining a first center axis, a first bore and an outer circumferential surface, wherein the centering ring is disposed between said at least one first element and said at least one second element, wherein said outer circumferential surface is configured to engage said at least one first element and said at least one second element at said first surface and said second surface in a form-locking manner, said annular wall having at least one second bore penetrating therethrough with a second center axis perpendicular to said first center axis,
   wherein said annular wall of said centering ring has one portion extending into a recess of said first element and another portion extending into a recess of said second element.

2. A construction kit as defined in claim 1, wherein said at least one of said elements is configured as an element selected from the group consisting of a linear module, and a rotary module.

3. A construction kit as defined in claim 1, wherein at least one of said elements is configured as a strut profile.

4. A construction as defined in claim 3, wherein said strut profile is configured as a housing of an element selected from the group consisting of a linear module, a rotary module, and a gripper.

5. A construction kit as defined in claim 4, wherein said housing has at least one outer face with at least one undercut longitudinal groove.

6. A construction kit as defined in claim 1, wherein the second center axis is located at a contact point of said first surface and said second surface.

7. A construction kit as defined in claim 1, further comprising two aligned second bores located diametrically opposite to one another and penetrating through said annular wall.

8. A construction kit as defined in claim 1, wherein said outer circumferential surface of said centering ring is configured as a cylindrical surface.

9. A construction kit as defined in claim 1, wherein said recess is configured as a bore.

10. A construction kit as defined in claim 1, wherein said recess has a depth that is equal to half a thickness of said centering ring.

\* \* \* \* \*